United States Patent
Bautista et al.

(10) Patent No.: US 6,824,802 B2
(45) Date of Patent: Nov. 30, 2004

(54) ON-DEMAND NEUTRALIZATION OF ACID-PRESERVED FOOD

(75) Inventors: Derrick Bautista, Sherman, CT (US); David Collins-Thompson, New Milford, CT (US)

(73) Assignee: Nestec S.A., Vevey (CH)

(*) Notice: Subject to any disclaimer, the term of this patent is extended or adjusted under 35 U.S.C. 154(b) by 325 days.

(21) Appl. No.: 09/970,010

(22) Filed: Oct. 2, 2001

(65) Prior Publication Data

US 2003/0066435 A1 Apr. 10, 2003

(51) Int. Cl.[7] .............................. A23B 4/12; A23B 4/20; A23B 4/24
(52) U.S. Cl. ...................... 426/335; 426/321; 426/326; 426/327
(58) Field of Search ................................ 426/335, 321, 426/326, 327

(56) References Cited

U.S. PATENT DOCUMENTS

| | | | |
|---|---|---|---|
| 3,539,359 A | 11/1970 | Murchison et al. | 426/113 |
| 4,022,917 A * | 5/1977 | Selenke | 426/532 |
| 4,478,860 A | 10/1984 | Hekal et al. | 426/267 |
| 4,927,657 A | 5/1990 | Antaki et al. | 426/589 |
| 2002/0064587 A1 * | 5/2002 | Redding, Jr. et al. | 426/552 |

FOREIGN PATENT DOCUMENTS

| | | | |
|---|---|---|---|
| EP | 0 322 996 | 5/1989 | A23L/1/16 |
| EP | 0 493 919 | 7/1992 | A23L/1/236 |
| GB | 1 221 183 | 2/1971 | A23L/1/40 |
| JP | 01 034490 | 2/1989 | A23L/2/38 |

* cited by examiner

Primary Examiner—Helen Pratt
(74) Attorney, Agent, or Firm—Winston & Strawn LLP

(57) ABSTRACT

The invention relates to a food composition having an increased shelf stability and robustness when stored in microbiologically sensitive conditions which comprises an acidifying preservative system adapted to reduce the microbial growth in the composition and a neutralizing system which is inactivated in said microbiologically sensitive conditions and is adapted to activate on demand upon reactivating conditions of the neutralizing system are met so that the neutralizing system acts on the acidifying preservative system to neutralize its sourness and/or acidity thereby improving the taste perception of the composition. The invention also relates to a dry blend usable as a preservative system in food, particularly deferred cooking food that requires storage in microbiologically sensitive conditions.

35 Claims, 5 Drawing Sheets

(A)

ON-DEMAND NEUTRALIZATION OF ACID-PRESERVED FOOD

TECHNICAL FIELD

Figure 1:
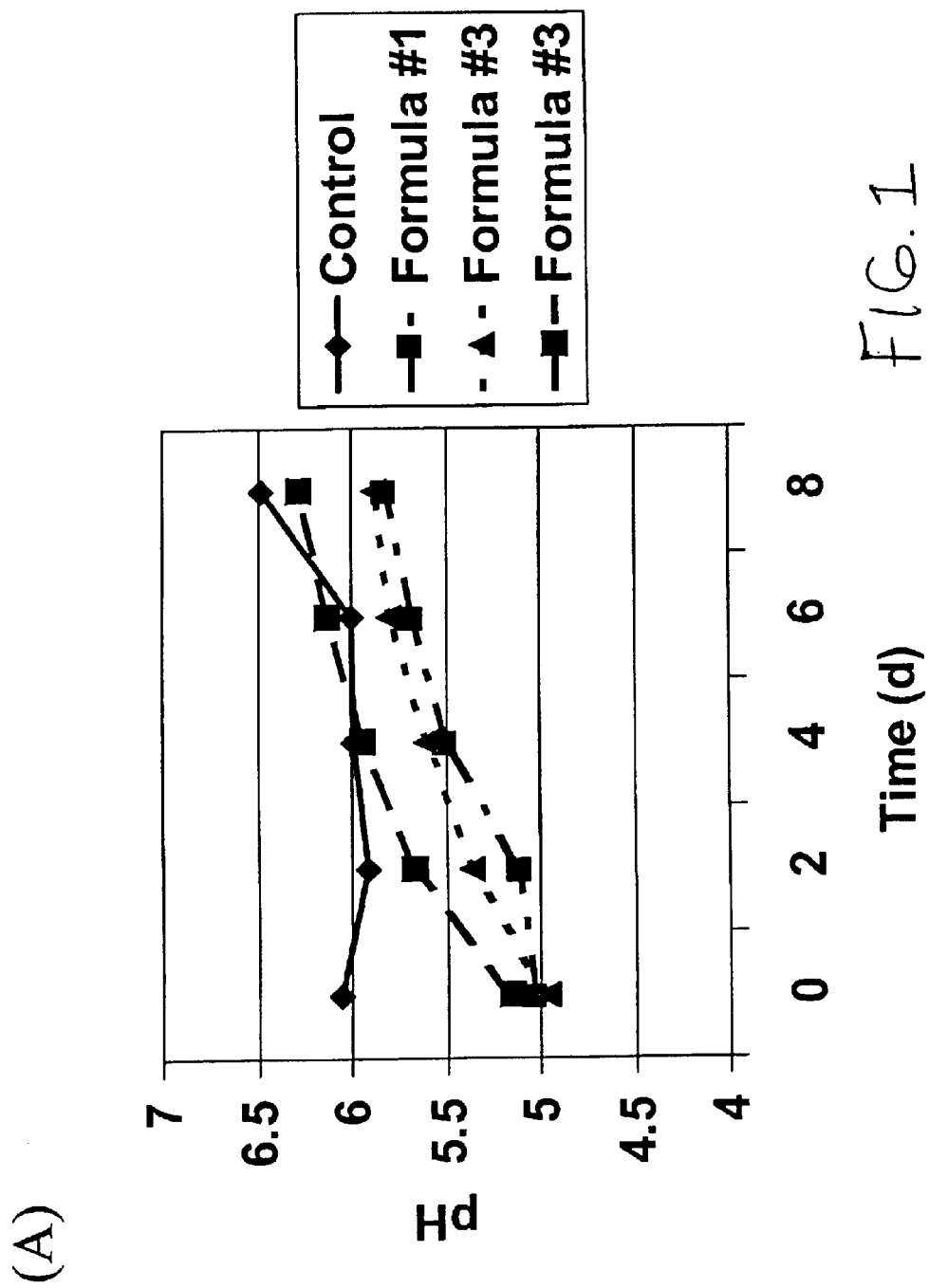
Figure 2:
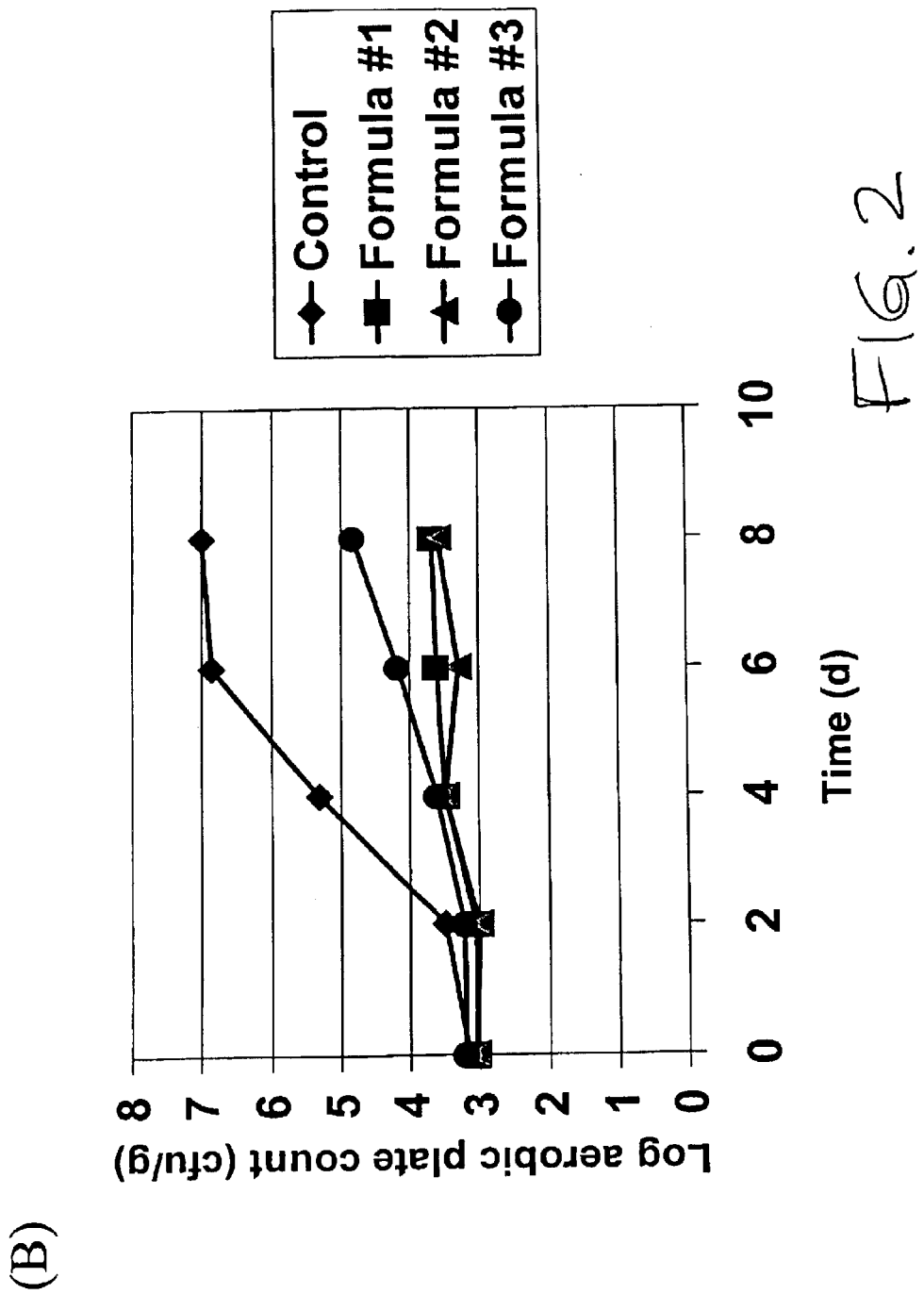

The present invention relates to a food composition adapted to produce a food product that has an enhanced robustness to microbiological spoilage and a reduced sourness. The invention also relates to a method for providing in a convenient manner a microbiologically robust food product of reduced sourness from such a food composition. The method also relates to a preservative blend that can be added to food, in particular to deferred cooking food, for the purpose of increasing its shelf life and improving its robustness without negatively affecting flavor or taste.

BACKGROUND OF THE INVENTION

Growing popularity for good tasting and convenient food products has increased in recent years. In food service areas or in food manufacturing plants, it is usual to prepare relatively large amounts of food products to consume at a later time. This is especially true of products derived from dehydrated forms. Food products such as naturally low acid products can quickly form a favorable medium and promote suitable conditions for rapid microbial growth as soon as they become hydrated, and this presents handling concerns.

Low acid food products need absolutely to be stored in refrigerated cabinets at a temperature that should not exceed 8° C. Such storage will inhibit the growth of bacteria, yeast and molds in the food product. Microbial growth also depends on the degree of contamination in the product during its preparation. Although measures can be taken to limit cross-contamination in manufacturing plants, it may be more difficult to ensure proper hygiene and handling in foodservice preparation kitchens. For example, it is known that food products may endure abuse temperature conditions (i.e., temperatures of 10° C. or higher) in these areas. Such conditions may occur when the refrigeration cabinet does not perform very well or when the cabinet is left open too often and/or too long.

Low-pH vegetable-based meals such as mashed potatoes are known for being very microbiologically sensitive products that become spoiled very quickly. To prevent microbial development, these products may be preserved under acidic conditions wherein the pH is maintained sufficiently low to suppress growth of pathogenic and spoilage bacteria. To be effective, the pH of the product needs to be maintained at values of less than 4.6 by adding an acidic preservative system of weak organic acids such as acetic acid or citric acid and/or acetates such as sodium acetate and other similar compounds.

Attempts to solve the problem of storage of low acid foods has been described in U.S. Pat. No. 4,145,451 to Oles, wherein microbiological spoilage is prevented by use of phosphoric acid in synergistic combination with acetic acid, and in absence of the usual chemical food preservatives.

U.S. Pat. No. 4,756,919 discloses a method of preserving food products against microbiological spoilage by adding thereto for preservation purpose fumaric acid or fumaric acid in combination with a food acidulent at a level sufficient to prevent spoilage.

After the food product has been treated with an acidic preservative system, however, it receives much lower acceptance from the consumer as compared to a food product that has not been treated at all. The problem of acceptance comes from the sourness and/or acidity of the product that adversely effect its original taste and organoleptic properties. The acidity may also cause other problems such as digestive or gastric issues. Thus, there is a need for increasing the shelf life of food products while preserving the taste perception and organoleptic properties of such products, and the present invention satisfies this need.

SUMMARY OF THE INVENTION

The present invention provides a solution to the problems of the art, more particularly in the use of its findings that the robustness and shelf life of a food product can be successfully improved while the organoleptic and taste properties of the product are properly restored at the time the product is ready for consumption.

The present invention thus benefits both the efficiency of the use of preservative in low acid food products and the maintainance of the organoleptic properties of food products, in particular, even, if non-exclusively, in naturally low acid food products. Consequently, the invention improves the quality and characteristics of food products that are acidified to endure a period of storage in microbiologically sensitive conditions without significant spoilage.

Also, the invention increases the shelf stability and robustness of food products that contain an acidic preservative system while reducing the sourness and/or acidity of the food product upon demand and/or before serving.

Furthermore, the present invention enables the storage of microbiologically sensitive food product in a cold or chilled environment for an extended period of time while not significantly affecting the organoleptic qualities of the food product at the time that the product is delivered to the consumer.

The invention also increases the shelf life of food products, more particularly of food products that are stored chilled for deferred cooking, without negatively affecting flavor and taste perception of such products.

Finally, the present invention increases convenience in the service of food products to consumers, in particular in the foodservice area, by allowing microbiologically sensitive food products to be prepared in advance and safely stored in wet and chilled environment while still providing a high quality, good tasting food product at the time of serving.

In its product aspect, the present invention relates to a food composition comprising an acidifying preservative system adapted to reduce the microbial growth in the composition. The preservative system is preferably effective when the composition is stored in microbiologically sensitive conditions. The composition further includes a neutralizing system adapted to neutralize the effect of the acidifying preservative system. Importantly, the neutralizing system is maintained substantially inactive at the time the food composition is in the microbiologically sensitive conditions of storage. The neutralizing system is preferably adapted to activate on demand, i.e., when reactivating conditions are met, so that the neutralizing system acts on the acidifying preservative system to neutralize its acidity thereby reducing the sourness and/or acidic taste and, consequently, improving or, at least restoring, the organoleptic perception of the food.

Conditions that are sensitive to the microbial growth for the food composition would be considered such when the food composition becomes sufficiently hydrated. The composition may become hydrated by addition of water, if the food component itself is dehydrated or, by the nature of the food component itself, if for instance, the food component is a fresh food such as fresh vegetables and the like.

In addition, conditions that are sensitive to the microbial growth further include temperature conditions which do not completely stop the growth of bacteria, yeast and molds and/or degradation of food. Those temperature conditions may be chilled conditions, abuse conditions or ambient temperature conditions.

The neutralizing system is preferably reactivable on demand such as by heating of the food composition. Heating may be carried out either on the sole purpose of reactivating the neutralizing system or on the combined purpose of reactivating the neutralizing system and serving the food composition hot or warm. In the first alternative, the food composition may be subsequently cooled down and served at a low temperature or cold temperature if, for instance, it fits the usual way of serving the food. In all cases, the neutralizing effect should preferably take place during the heating phase or, at least, at the final stage of the heating.

In a preferred aspect of the invention, the neutralizing system is encapsulated to substantially resist, or at least delay, the full release of the neutralizing effect when the composition is maintained in microbiologically sensitive conditions of storage. By "substantially resistance to release", it is meant that a certain level of release of the neutralizing system may be accepted over a period of from about 1 to 7 and preferably from 2 to 5 days, even if not preferred, provided the acidifying preservative system still remains effective enough in reducing the microbial spoilage.

The invention also relates to a dry blend of an acidifying preservative system adapted to prevent or, at least reduce, the microbial growth in a food when the food is stored in microbiologically sensitive conditions and a neutralizing system. In this embodiment, the neutralizing system is encapsulated to substantially delay release in the microbiologically sensitive conditions and is adapted to fully release upon heating of the neutralizing system so that the neutralizing system acts on the acidifying preservative system to neutralize its sourness and/or acidity thereby improving the taste perception of the food.

In its process aspect, the present invention is directed to a method for increasing shelf stability of a microbiologically sensitive food composition under standard storage temperature conditions and robustness of the composition under abuse temperature conditions by adding an acidifying preservative system in sufficient amounts to preserve the food against microbial spoilage, and an on-demand reactivable neutralizing system to decrease the sourness and/or acidity of the food composition when reactivated.

In a more specific and focused aspect, the method of the invention may preferably be used for providing to a foodservice, manufacturing or selling location an hydratable food composition of improved microbiological robustness, when it is in hydrated form. Thus, the method comprises providing a dehydrated food composition including a dry food component, a preservative system effective to reduce the microbiological growth in refrigerated and abuse conditions, a neutralizing system that is essentially activable on demand.

In a preferred aspect of this method, the neutralizing agent is activable by raising the temperature of the composition to a temperature range higher than the temperature range of the microbial sensitive storage conditions and sufficient to activate the neutralizing system.

The invention also relates to the use of a combination of an acidifying preservative system and a neutralizing system in a food composition to improve the taste perception or organoleptic properties of the product. Again, the acidifying preservative system is used in an amount effective for preventing or at least reducing the microbial growth in the food composition while the neutralizing system is inactivated in microbiologically sensitive conditions of storage of the food composition but is adapted to activate on demand to act on the acidifying preservative system to neutralize its sourness and/or acidity thereby improving the taste perception or organoleptic properties of the food composition.

DETAILED DESCRIPTION OF THE PREFERRED EMBODIMENTS

The present invention relates to a food composition that has enhanced properties of robustness and an extended shelf stability obtained by the use of an acidic preservative system in amounts effective enough for the intended purpose and that further has properties to neutralize the sourness and/or acidity of the preservative system by the use of a neutralizing system that acts on demand on the acidic preservative system to at least partially neutralize the preservative system and, consequently, improve the organoleptic properties and perception of taste of the food.

The term "robustness" as used herein refers to the ability of the food composition to offer an effective antimicrobial effect when the compositon is submitted to abuse conditions of storage.

The term "abuse conditions" used herein refers to conditions of temperature that usually exceed the recommended conditions of storage for the intended food product. In particular, it is recommended to maintain low acid food products such as mixed or mashed products at a refrigerated temperature just above the freezing point, between 1 to 8° C., preferably at 4 and 7° C., in the US and UK, respectively, during storage of the wet product.

The term "extended shelf stability" used herein refers to the relative ability to increase the life time of the composition when stored under the microbiologically sensitive conditions of storage as compared to a composition with no acidic preservatives.

The term "microbiological spoilage", as used herein, relates to the spoilage that is caused by growth of yeast, mold and/or bacteria including lactobacilli.

The Preservative System:

The use of acidic preservatives in the present invention is essential to maintain low pH conditions in the food medium so that no significant spoilage may occur during the storage period of the food. The types, amounts and relative proportions of the acidic preservatives may greatly depend on the nature of food, temperature conditions and packaging conditions. As low pH conditions, it is referred to pH values of 5 or lower, more preferably to pH of from 3 to 5. At these effective values of pH, panel tests have shown that the taste appears relatively sour and usual food such as naturally low acid foods are strongly affected by the sourness and acidity coming from the preservatives thereby reducing the consumer's acceptance of the product.

The preservative system may preferably comprise an acidulent consisting of at least one organic acid effective for its antimicrobial effect in food. Unsaturated organic carboxylic acids are known for their increased antimicrobial effect as compared to saturated acids and are preferred for that reason.

The acidulent may be chosen among the group consisting of citric acid, ascorbic acid, sorbic acid, tartaric acid, cream of tarter, fumaric acid, lactic acid, malic acid, acetic and combinations thereof. In a preferred embodiment, the acidulent is citric acid in powder form that is to be dry blended into the product. The use of a dry acid is to maintain the product in a fully dehydrated form for extended periods until ready for use. Suitable levels of organic acid, and preferably when citric acid is used, range from about 0.05 to 5 wt %, or more preferably about 0.1 to 0.2 wt % of the total dry food composition.

The preservative system may preferably comprise at least one preservative agent in addition to the acidulent that acts with the acidulent to offer an enhanced antimicrobial effect within the food medium. A preservative agent in the context of the invention may preferably comprise one or more salt(s) of weak organic acid(s) that has (have) the ability to completely dissociate in aqueous solution. When combined in an acidic environment, the salt of organic acid will form a level of undissociated molecules which are antimicrobial in nature. The salts of organic acids have the disadvantage to increase the sourness of the food product in concentration effective for the intended anti-spoilage effect of the perishable food. Salts of organic acids that are generally useful in the product and method of the invention include alkai metal citrates, benzoates, gluconates, sorbates and the like. These are advantageously utilized in a dry crystal form. Preferably, sodium acetate, monosodium citrate, trisodium citrate, potassium benzoate, sodium benzoate, potassium citrate, potassium gluconate, potassium sorbate, and combinations thereof can be used. Those salts are available in a crystal form that can be added in the required amounts to the food product. As the food product becomes hydrated, the crystals tend to dissolve in the food product in an homogeneous manner. In a more preferred embodiment, acetate, preferably sodium acetate, is used. Suitable levels of these salts range from about 0.05 to 5 % wt, and more preferably, form about 0.1 to 2 % wt. of the dry composition.

It has been found advantageous that the acidulent and salt-based preservative agent be used in combination in a ratio of from 1:1 to 5:1, preferably of from 2:1 to 4:1 (wt/wt) so that the antimicrobial effect is maximized.

When the food product is a dehydrated food product that has to be reconstituted in an aqueous medium, the total amount of the preservative system should be controlled depending on the dilution ratio of the dry food product in water to provide the effective antimicrobial effect. In particular, the preservative system form should preferably represent in total about 0.01 to 1 % wt, even more preferably about 0.1 to 0.5 % wt, of the reconstituted moisturized food composition.

The invention could be configured that would not include the preservative agent (e.g., sodium acetate), but the preservative system would presumably be not as efficient as when the preservative agent is included.

The Food Product:

The food product of the invention may be a solid, liquid, pourable, semi-solid, emulsified or non-emulsified, food product. The food product may include, but not limited to vegetables, salad, porridge, soup, sauce, fish, meat, beverage, dressing, cream, a baked product, dough and combinations thereof. The food product may preferably be stored under a form that favors preservation under long term storage at ambient. For instance, the food product may be a dry or liquid concentrated food product.

When in dry form, the food product should have the ability to reconstitute with water or any similar aqueous medium such as milk or an emulsion such as salad dressing and the like. Dry food products are those obtained by dessication, freeze-drying, spray drying or other drying methods usually used in food technology. Dry food product may form flakes, granules, powder, particulates, pieces and combinations thereof. In the dry form, the food product may be kept several months in a packaging that performs against rancidity. The product may be packaged in sealed flow packs such as in aluminized plastic laminates in normal or eventually modified low oxygen atmosphere. At the time the product is prepared, the dry composition is combined with a recommended amount of water, in a container, with optionally additional ingredients such as shortenings, milk, salt, and optionally spices and the composition is stirred until to obtain a proper desired texture. The preparation is placed in a chilled cabinet until it is time for serving it.

In its initial stage, the food product may also already be partially or fully moisturized. When partially moisturized, the food product may be a liquid concentrate of relatively low water activity; e.g., less than 0.8 so that the food product may be kept stored for several months at ambient temperature storage conditions. The partially or fully hydrated products may advantageously be packaged in pouches, bottles or packs. The product can be stored under aseptic conditions. For instance, the product may be filled aseptically and/or its packaging may be flushed with a low oxygen gas such as $N_2$, $CO_2$ or combination.

Importantly, the food product is intended to form a wet food product that becomes sensitive to ambient when water is added to it in a preparation stage. The preparation stage may be carried out in various configurations such as in the course of the preparation of a complex meal. For instance, the preparation stage may be carried out in a manufacturing plant or in a foodservice place. As soon as the food product receives mositure or water and becomes wet, the food product is usually stored in a chilled cabinet; i.e., at temperature below 10° C., so that microbial growth is significantly slowed.

The food product may also be manufactured from fresh food ingredients that are packaged in a suitable package such as in plastic or aluminum lidded trays under modified atmosphere and directly stored under chilled temperatures.

The On-Demand Neutralizing System:

According to one essential aspect, the food composition further comprises a neutralizing system that is adapted to act on the preservative system only on demand. The neutralizing system is resistant to activation in the conditions of storage including the wet conditions in a chilled environment. The neutralizing system may preferably be activated by heating the composition. The heating may correspond to the latest stage of the preparation of the meal that contains the food product. In an alternative, the heating stage may be an intermediate stage that is requested to suppress the sourness and/or acidity of the food, and the food may be cooled down or frozen before serving it, if required.

The amount of the neutralizing system in play directly depends on the amount of the preservative system in the food composition so that the neutralizating effect can take place without providing an aftertaste either alkaline or acidic. The active neutralizing agent in the neutralizing system should have GRAS (Generally Regarded As Safe) status, should be water soluble, should evenly distribute upon heating and should not impart undesirable attributes to the food product.

In a preferred aspect of the invention, the neutralizing system is rendered heat-activable by encapsulating the active neutralizing agent with an edible material that sufficiently resists leakage during the short-term storage in the sensitive conditions. Resistance to leakage should be of at least 2 days, preferably of 3 to 4 days, when the product is maintained under wet and chilled conditions. The encapsulating material should preferably resists melting at temperature of less than 50° C., more preferably less than 35° C., so that any premature accidental release of the neutralizing agent can be successfully avoided such as when the outside temperatures of transport, storage, etc. are relatively elevated. The encapsulating material may preferably be composed of fat materials from hydrogenated or partially hydrogenated vegetable oil, animal fat, combination or their derivation. The choice of fat is mainly dictated by its ability to resist degradation or solubilization in a wet non-heated environment and its ability to melt or degrade in a heated environment. Therefore, hydrocolloid-based coating should be avoided as the presence of moisture in the food would normally cause the coating to solubilize thereby creating leakage of the active neutralizing agent. The encapsulating material should typically be composed of a lipid or lipid mixture having a melting point adapted to the final nature of the product. For instance, if the food product is intended to be heated at high temperature such as for mashed potatoes or orther hot meals, the fat should preferably be chosen among oils or fat having a high melting point such as cottonseed oil (melting point of about 63° C.), soybean oil (m.p. about 70° C.) or palm oil (m.p. about 54 ° C.). To the contrary, if the product is intended to be submitted to a warm temperature stage such as a process of natural fermentation, e.g., dough proofing, the fat will be chosen among the low melting point solid fat such as high laurate canola oil (m.p. about 38° C.) and the like.

The encapsulation may be obtained by various known methods such as by fluid bed coating, spray drying, spray chilling, spinning disk, tumbling or coacervation. In fluid bed coating, the first step consists in melting the oil or fat as it is a hard fat at room temperature. Concurrently, the neutralizing agent is introduced into a fluidized bed reactor for the encapsulation process. The air flow passing through the reactor is adjusted so that the particles are slightly levitated. The liquidized and free flowing oil is then sprayed over the active agent in the fluidized bed reactor, thereby encapsulating it. The fluid air levitating the agent is cooled, hereby causing the fat to solidify and encapsulate the agent. After the desired amount of coating is applied, the encapsulated agent is then removed from the fluidized bed reactor.

The neutralizing system is preferably formed from encapsulated food grade alkaline pH raiser such as phosphate that can be used in crystal or powder form. Crystallized phosphate is highly soluble in water when it is not encapsulated. The encapsulation should sufficiently diminish or delay the propensity of the phosphate crystals to solubilize in the moisturized food.

Phosphates useful in the present invention include monosodium phosphate, di-sodium phosphate, tri-sodium phosphate, sodium bicarbonate, calcium phosphates and combinations thereof. This may include other materials that do not contain phosphates such as sodium hydroxide, calcium oxide and calcium hydroxide. Very positive results have been found when using trisodium phosphate at 30% activity encapsulated in vegetable oil. As previously mentionned, the amount of neutralizing system should depend on the overall preservative amounts. The amount of alkaline pH raiser directly depends on the amount of preservative agents to be neutralized. It has been found preferable to have an amount of alkaline pH raiser of from about 0.05 to 8 % wt of the dry composition including the food part. If a dry blend is prepared with the acidifying system and neutralizing system together intended for addition to a food such as a commercial food, the ratio acidifying system: neutralizing system should preferably be of from about 1:1 to 1:10, preferably, 1:1.5 to 1:3. When using phosphate, it has been found that effective amounts of phosphate, preferably sodium phosphate, are within the range of from about 1 to 6 % wt of the dry composition and of from about 0.05 to 2 % wt, even more preferably about 0.1 to 1 % wt, of the fully hydrated composition.

More particularly, the following relative proportions of the acidulent, the preservative agent and the alkaline pH raiser are preferred for respectively dry or concentrate and fully reconstituted compositions (in % by weight):

1. Dry or partially moiturized composition to be reconstituted with water at a dilution ratio of 1:1 to 1:10:
   Food product: between 90 to 99%;
   Citric acid: between 0.1 to 2%;
   Sodium acetate: between 0.1 to 2%
   Encapsulated trisodium phosphate: between 1 to 6%.
2. Fully hydrated composition:
   Food product: between 10 to 20%;
   Citric acid: between 0.1 to 1%;
   Sodium acetate: between 0.05 to 1%;
   Encapsulated trisodium phosphate: between 0.1 to 1%;
   Water: between 50 to 99%.

As aforementioned, the food composition of the invention may include both the preservative system and the neutralizing system, as described above, during the manufacturing stage. It is also possible to envision that the neutralizing system be included at a later or deferred stage; i.e., at the time the food product is prepared and stored at the microbiologically sensitive conditions; e.g., just before being kept chilled in a refrigerator or cold room. In that particular case, the acidified composition without the neutralizing system and the neutralizing system itself may be packaged separately. One benefit could be to prevent the degradation or deterioration of one component by another. For instance, the encapsulation of the neutralizing system may be prevented from degradation or deterioration that could be generated by chemical and/or physical effects in the package with ingredients of the composition such as by oxidation, Maillard reaction, accelerated rancidity, etc.

Dry Preservative Blend for Deferred Cooking Food Product:

The invention also encompasses a dry preservative blend that can be used by addition to food, such as commercially available food that requires to be stored in microbiologically sensitive conditions and deferred cooking and/or serving. The dry preservative blend comprises the acidifying preservative system adapted to prevent or at least reduce the microbial growth in the food and a neutralizing system that is encapsulated to substantially delay the release in the microbiologically sensitive conditions and is adapted to fully release upon heating of the neutralizing system. The blend may be packed in any suitable closed container or sachet adapted for extensive storage of dry substances. The blend is added to the food and thoroughly mixed to the food to form an acid preserved food composition that is capable of withstanding several days in the compartment of a refrigerator or a cold room without significant spoilage. Once, the food is served, the food is heated to a temperature sufficient to fuse the fat based encapsulation and release the neutralization agent in the food thereby restoring a pH close to its original pH and a normal taste without sourness.

The present invention also encompasses a method for providing to a foodservice, manufacturing or selling location of a hydrated food composition of improved microbiological robustness. The method may comprise in one or more steps: providing a food composition including a dry food component, providing a preservative system effective to maintain microbiological safety in refrigerated and abuse conditions, and providing a neutralizing system that is essentially activable when the food composition is substantially heated. The method may be applicable in food manufacturing plants or in the preparation of food in food distribution channels such as in restaurants, hospitals, convalescent houses, airline catering, supermarkets, convenient stores, etc. In particular, the method is ideal for deferred cooking and vending applications to provide further protection during cold storage. In airline catering, for instance, the food composition can be prepared in advance on the ground and stored in chilled carts in the aircraft until the product is ready for being rethermalized just before serving to the passagers. The preservative system maintains the food product microbiologically safe until the very last moment the product is served. The neutralizing system suppresses the acidity and sourness of the preservative system when the product is heated just before the product is served. Such a method avoids the need for thermalizing the food products in advance, avoids overdrying of the food and requires less energy consumption.

EXAMPLES

The following examples are given by way of illustration of the present inventions and should in no way be considered as a limitation to the system of the invention.

Using cold reconstituted mashed potatoes, the results suggest that the neutralization system can resist the effects of abused storage temperatures and provide a level of safety against bacterial growth. Furthermore, samples treated with various levels of the acid/neutralization system of the invention was able to extend longer shelf-life than untreated samples under normal storage conditions.

Example 1

Experiments were carried out to confirm the effect of the preservative, acidulant and neutralizing agent on the extension of shelf-stability and robustness of the food composition.

An "in-house" mixture of bacteria derived from a water source was grown in Brain Heart Infusion broth (BHI; Difco, Detroit, Mich.) at 30° C. overnight (about 8 Hours). To acclimatize the microorganisms, the culture was divided into two equal portions and stored at either 6° C. or 12° C. for 8 Hrs.

"Maggi Mousline Purée de Pommes de Terre Flocons" (distributed by Nestle FoodServices, France) was used in this study. Four types of formulations were evaluated. First, a control (about 500 g) was made according to the manufacturer's instructions (i.e., without salt). Second, a series of reformulated mashed potato product were made (about 500 g) with materials depicted in Table 1. The dry ingredients were thoroughly mixed prior to reconstitution with water.

TABLE 1

List of materials used to implement the acid/neutralization system of the invention in mashed potatoes (% w/w)

| Ingredients | Formula #1 | Formula #2 | Formula #3 |
|---|---|---|---|
| Potato flakes (Mousline; Nestlé Food Service) | 14.300 | 14.300 | 14.300 |
| Sodium Acetate (Sigma; St. Louis, MO) | 0.125 | 0.100 | 0.075 |
| Citric Acid (Sigma; St. Louis, MO) | 0.190 | 0.165 | 0.125 |
| Encapsulated Trisodium Phosphate at 30% activity (Balchem, State Hill, NY) | 0.690 | 0.690 | 0.675 |
| Water (Poland Spring water)* | 84.695 | 84.745 | 84.825 |

*Added after thoroughly mixing dry ingredients together.

The trisodium phosphate was granulates of 2% maximum on #10 mesh and was encapsulated by partially hydrogenated vegetable oil. The activity of the phosphate (30%) corresponds to the amount that is not encapsulated. The It was manufactured by Balchem, State Hill, Mo.

Then, each reconstituted mashed potato product was divided into two equal halves. Each half of product was inoculated to achieve a final concentration of about $1\times10^3$ colony forming units/g (cfu/g) with a mixed culture acclimatized to either 6 or 12° C. Depending on the type of inoculum, the mashed potatoes were stored at 6 or 12° C. The experiment was repeated. twice.

For all samples stored at 6 and 12° C., microbial analysis and pH determination were performed at day 0 and every second day. Determination of acidity of the mashed potato was performed by aseptically sampling product with a pH meter (Orion Model 420A). Samples were prepared for microbial analysis by performing a 1:10 dilution of mashed potatoes in 0.1% peptone water (Difco, Detroit, Mich.) and stomached (seward Laboratory Blender, Model Stomacher 400; London, UK) for 2 min under the Normal Setting. Microbial analysis included spread plates with aerobic plate count agar (Difco). Plates were incubated at 30° C. for 24–48 Hrs and counted. Microbial analysis was performed in duplicate for each sample.

All microbiological results were analyzed using the General Linear Model of SAS (Statistical Analysis Software, Cary, N.C.).

Using the formulation depicted in table 1, products were prepared using cold spring water and were refrigerated until the test day. At testing, samples were heated to 82° C. using steam oven (Rational Original Combi-Steamer CCM 101; steam setting). The products were placed into a steam table and held at 80° C. until presented to the panelists.

Under storage at 6° C., the initial pH of mashed potato with control, formula #1, formula #2 and formula #3 were 6.05, 5.03, 4.97 and 5.15, respectively. The results are visible in FIG. 1. The encapsulated trisodium phosphate in the treated samples slightly released during the study and raised the pH towards neutrality. The level where the pH had increased in the treated samples was dependent on the formulation of the mashed potato product.

Upon examination of the aerobic plate count data, bacterial development occured after the $2^{nd}$ day in control samples. However, bacterial growth was considerably lower in all of the treated mashed potatoes as it is shown in FIG.

2. Only, formulation #3 had a slight increase in bacterial growth after $4^{th}$ day.

Figure 3:
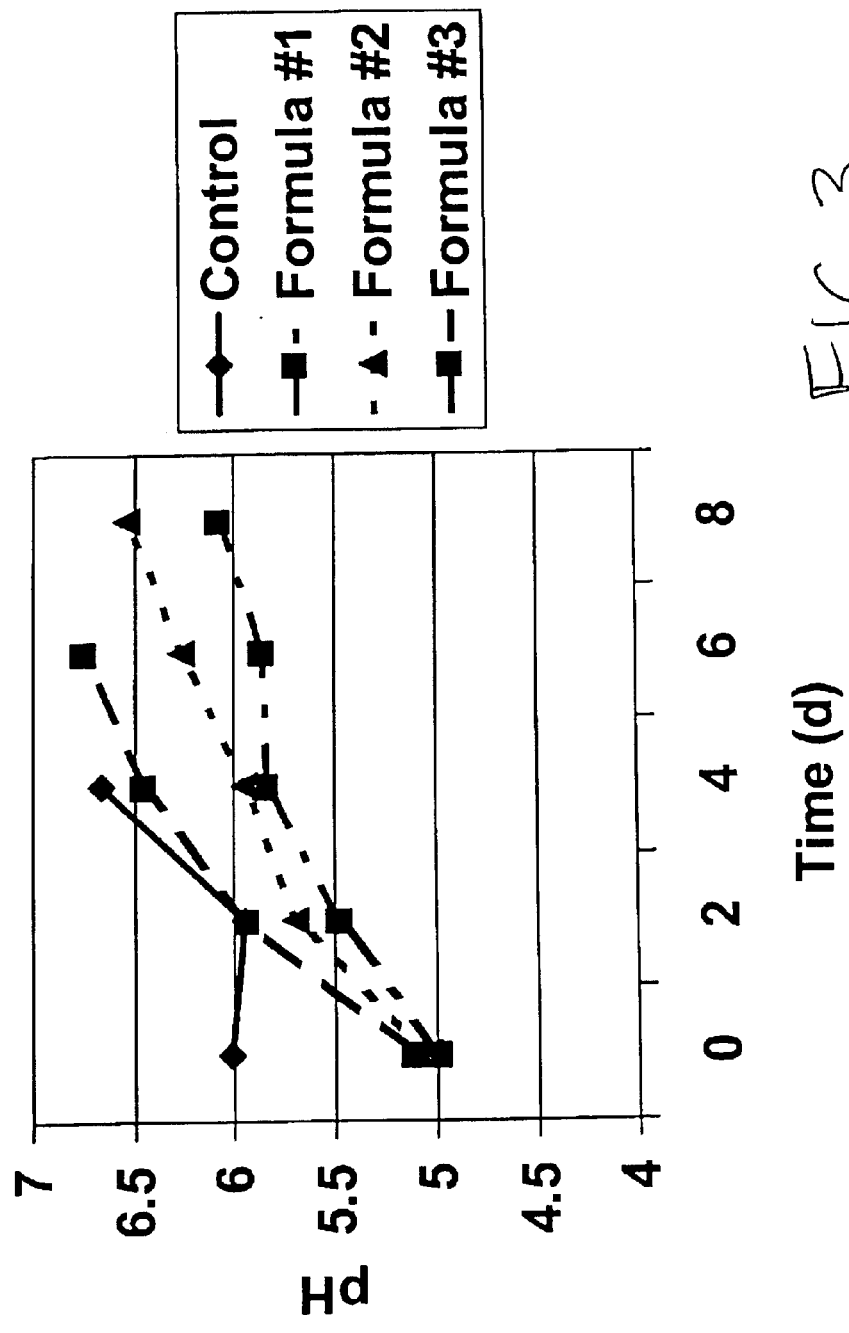

As shown in FIG. 3, similar findings were observed for samples stored under 12° C. (i.e., abuse conditions). The initial pH of control, formula #1, formula #2 and formula #3 mashed potatoes were 6.01, 4.99, 5.04 and 5.11, respectively. Once again, the encapsulated trisodium phosphate slightly released and raised the treated samples towards neutrality.

Figure 4:
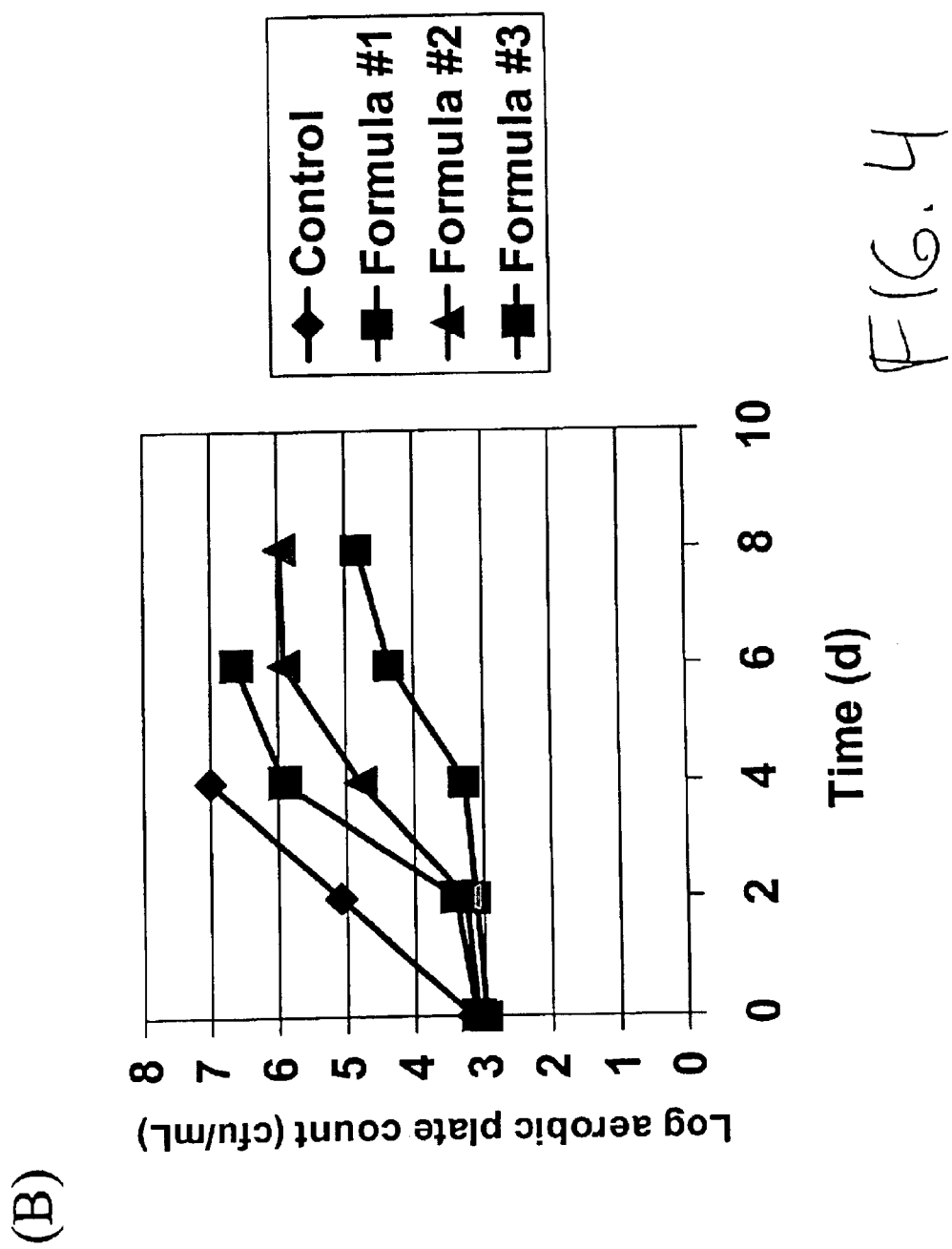

Under 12° C. storage, aerobic bacteria development steadily increased in control samples from day 0. In formulation #3 mashed potatoes, bacterial development was significantly (p<0.001) suppressed for 2 days. Then, bacterial development was initiated and reached $1\times10^6$ cfu/g by the $4^{th}$ day. A similar lag time was observed with the formula #2 mashed potatoes. However, bacterial development did not reach $1\times10^6$ cfu/g until the $6^{th}$ day. In formula #3 mashed potatoes, the lag time was extend to 4 days and bacterial development never reached $1\times10^6$ cfu/g even after 8 days of storage at 12° C. Those results are illustrated in FIG. 4.

At either storage conditions, bacterial growth appeared to be suppressed in all of the treated mashed potatoes until the pH reached 5.8 to 6. Two possible explanations could be accounted for this observation. First, the reduction of antimicrobial activity would occur as the system increases in pH and subsequently, decreases the amount of undissociated acid. Secondly, the bacterial population could compensate for the preservation system at more neutral environments.

Using descriptive analysis, sensory evaluation was performed on the various formulations of mashed potato product by 11 trained panelists. Samples were presented individually to the panelists in 4 oz plastic cups with lids and at a serving temperature of 71 ° C. The panelists were requested to evaluate different attributes of the product using a 15 cm line scale. The attributes evaluated were: potato aroma, acidic aroma, potato flavor and sourness.

Analysis of variance and Duncan multiple range test was used to interpret the results of the sensory evaluation.

At the time of sensory evaluation, all mashed potato products had reached a pH of 6 to 6.2 upon heating. Of the three formulation evaluated, formula #3 was closest to the control mashed potatoes. Upon cooking (i.e., to 80° C. in a steam oven), the trained taste panelists were unable to significantly (p>0.05) distinguish sour note between control samples and neutralized system of formula #3. However, it had slightly lower levels of potato flavor.

Figure 5:
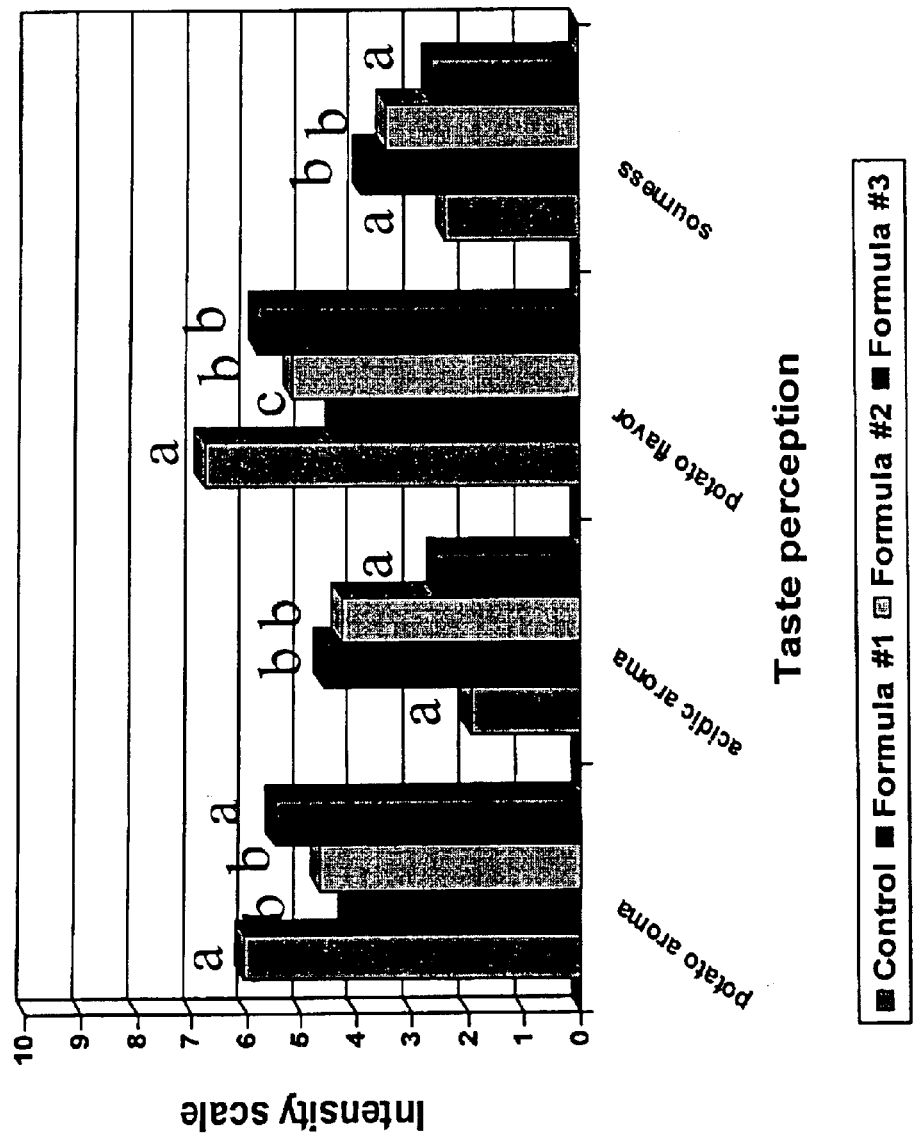

In formulation #2 and #3, trained taste panelists were able to significantly (p<0.05) differentiate potato aroma, acidic aroma, potato flavor when compared to control samples of mashed potato. All those results are compiled in FIG. 5.

Example 2

In a separate study, *Listeria monocytogens* (a foodborne pathogen) was inoculated into a mashed potato product with the acid/neutralization system. The cold reconstituted mashed potatoes (Mousline) was made up with and without 0.125% acetate and encapsulated tri-sodium phosphate (Formula #1). *Listeria monocytogenes* was added to both the control (no acid/phosphate) and treated samples at 100 cfu/g. These samples were then incubated at 6° C. and analyzed every two days for up to 8 days for the growth of *Listeria monocytogenes*.

In Table 2, the results show that *Listeria monocytogenes* was controlled by the acid/neutralization system over a period of 8 days.

TABLE 2

Growth of *Listeria monocytogenes* in mashed potatoes treated with and without the acid and neutralization system of the invention

| Days at 6° C. | Control (Listeria counts log cfu/g) | Test (Listeria counts log cfu/g) |
| --- | --- | --- |
| 0 | 1.5 | 1.5 |
| 2 | 1.8 | 1.5 |
| 4 | 3.0 | 1.6 |
| 6 | 3.8 | 1.6 |
| 8 | 4.9 | 1.7 |

Although the present invention has been described in terms of preferred embodiments, it will be appreciated that many alterations and modifications of the invention will no doubt become apparent to those of ordinary skill in the art. Accordingly, it is intended that the disclosure be considered as exemplary rather than limiting, and that the appended claims be interpreted as covering all such alterations and modifications that fall within the true spirit and scope of the invention.

What is claimed is:

1. A food composition comprising a blend of an acidifying preservative system which is adapted to provide an antimicrobial effect to reduce microbial growth in the composition when the composition is stored in microbiologically sensitive conditions, and a neutralizing system which is inactivated in the microbiologically sensitive conditions but is adapted to activate on demand upon reactivating conditions of the neutralizing system so that the neutralizing system acts on the acidifying preservative system to reduce its sourness and/or acidity thereby improving the taste perception of the food composition, wherein the acidifying preservative system is free of strong acid and comprises an acidulent of at least one unsaturated organic carboxylic acid and a salt-based preservative agent comprising at least one salt of an organic acid that forms in combination with the acidulent a level of undissociated molecules to enhance the antimicrobial effect of the acidifying preservative system.

2. A food composition according to claim 1, wherein the neutralizing system is reactivable by heating the composition.

3. A food composition according to claim 2, wherein the neutralizing system is encapsulated to substantially resist, or at least delay, release of the neutralizing effect when the composition is maintained in the microbiologically sensitive conditions of storage.

4. A food composition according to claim 1, wherein the microbiologically sensitive conditions of storage essentially consists in maintaining the food composition in hydrated form under chilled temperatures.

5. A food composition according to claim 1, wherein the acidulent is citric acid, ascorbic acid, sorbic acid, tartaric acid, cream of tarter, fumaric acid, lactic acid, malic acid, acetic acid, or a combination thereof.

6. A food composition according to claim 1, wherein the salt-based preservative agent is sodium acetate, monosodium citrate, trisodium citrate, potassium benzoate, sodium benzoate, potassium citrate, potassium gluconate, potassium sorbate, and or combination thereof.

7. A food composition according to claim 1, wherein the acidulent and the salt-based preservative agent are used in combination at a ratio of from 1:1 to 5:1 (wt/wt).

8. A food composition according to claim 1, wherein the neutralizing system comprises a pH raising agent selected from the group consisting of organic phosphates, oxides, hydroxides or combinations thereof.

9. A food composition according to claim 8, wherein the pH raising agent is selected from the group consisting of mono-sodium phosphate, di-sodium phosphate, tri-sodium phosphate, calcium phosphate, sodium bicarbonate, calcium oxide, calcium hydroxide, sodium hydroxide or a combination thereof.

10. A food composition according to claim 8, comprising between about 0.05 to 5% wt of the acidulent, between about 0.05 to 5% wt of the salt-based preservative agent and between about 0.05 to 8% wt of the pH raising agent.

11. A food composition according to claim 10, comprising from about 0.1 to 2wt % citric acid, from about 0.1 to 2wt % sodium acetate and from 1 to 6 wt % encapsulated trisodium phosphate.

12. A food composition according to claim 8, comprising between about 0.1 to 2% wt of the acidulent, between about 0.1 to 2% wt of the salt-based preservative agent and between about 1 to 6% wt of the pH raising agent.

13. A food composition according to claim 1, in dehydrated form and capable of reconstitution by contact with an aqueous medium.

14. A food composition according to claim 13, wherein the food is a naturally low acid food.

15. A food composition according to claim 1, wherein the food is at least a partially hydrated food.

16. A food composition according to claim 15, wherein the food is a fully hydrated food.

17. A food composition according to claim 15, wherein the food is a concentrate.

18. A food composition according to claim 1, wherein said preservative system is effective to preserve the composition against microbial spoilage during at least 2 days at chilled storage conditions.

19. A food composition comprising an acidifying preservative system which is adapted to reduce microbial growth when the composition is stored in microbiologically sensitive conditions, and a neutralizing system which is inactivated in the microbiologically sensitive conditions but is adapted to activate on demand upon reactivating conditions of the neutralizing system, so that the neutralizing system acts on the acidifying preservative system to reduce us sourness and/or acidity thereby improving the taste perception of the composition, wherein the food comprises mashed vegetables.

20. A food composition comprising an acidifying preservative system which is adapted to reduce microbial growth when the composition is stored in microbiologically sensitive conditions, and a neutralizing system which is inactivated in the microbiologically sensitive conditions but is adapted to activate on demand upon reactivating conditions of the neutralizing system, so that the neutralizing system acts on the acidifying preservative system to reduce its sourness and/or acidity thereby improving the taste perception of the composition, wherein the food comprises ingredients for reconstituting a sauce or soup.

21. A method for increasing both shelf stability of a food composition under standard storage temperature conditions and robustness of the composition under abuse storage temperature conditions by adding to the food composition an acidifying preservative system which provides an antimicrobial effect to the composition, the preservative system being added in sufficient amounts to reduce microbial spoilage in the food when in hydrated conditions, and an on-demand reactivable neutralizing system which is inactivated under standard storage conditions but is adapted to activate on demand upon reactivating conditions of the neutralizing system so that the neutralizing system acts on the acidifying preservative system to decrease sourness and/or acidity of the food, wherein the acidifying preservative system is free of strong acid and comprises an acidulent of at least one unsaturated organic carboxylic acid and a salt-based preservative agent comprising at least one salt of an organic acid that forms in combination with the acidulent a level of undissociated molecules to enhance the antimicrobial effect of the acidifying preservative system.

22. A method according to claim 21, wherein the food composition is hydrated before storage.

23. A method according to claim 21, wherein the neutralizing system is activable by heating the food composition.

24. A method according to claim 21, wherein the food composition comes from a dehydrated composition that is moisturized for storing in refrigerated conditions.

25. A method according to claim 24, wherein the heat-activable neutralizing system is present in the dehydrated composition in an encapsulated form.

26. A method according to claim 22, wherein the heat-activable neutralizing system is present in the moisturized composition in an encapsulated form.

27. A method according to claim 21, wherein the heat-activable neutralizing system is added separately at the time the composition is moisturized.

28. A method for providing to a foodservice, manufacturing or selling location a hydrated food composition having improved microbiological robustness which comprises providing, in a dehydratable food composition including a dry food component, a preservative system in an amount sufficient to provide an antimicrobial effect to the composition to reduce microbiological growth during refrigerated or abuse conditions of rehydration of the food composition, and a neutralizing system that is essentially activable when the rehydrated food composition is substantially heated, such that the neutralizing system, when activated, acts to increase the organoleptic properties of the food product, wherein the preservative system is free of strong acid and comprises an acidulent of at least one unsaturated organic carboxylic acid and a salt-based preservative agent comprising at least one salt of an organic acid that forms in combination with the acidulent a level of undissociated molecules to enhance the antimicrobial effect of the preservative system.

29. A dry blend of an acidifying preservative system which is adapted to provide an antimicrobial effect to the composition to prevent or at least reduce the microbial growth of a food when the food is stored in microbiologically sensitive conditions and a neutralizing system, wherein the neutralizing system is encapsulated to substantially delay its release during storage at the microbiologically sensitive conditions, but is adapted to fully release upon heating of the neutralizing system so that the neutralizing system acts on the acidifying preservative system to neutralize its sourness and/or acidity thereby improving the taste perception of the food, wherein the acidifying preservative system is free of strong acid and comprises an acidulent of at least one unsaturated organic carboxylic acid and a salt-based preservative agent comprising at least one salt of an organic acid that forms in combination with the acidulent a level of undissociated molecules to enhance the antimicrobial effect of the acidifying preservative system.

30. Dry blend according to claim 29, wherein the acidifying preservative system comprises at least one organic acid associated to a salt of organic acid in a ratio of from 1:1 to 5:1.

31. Dry blend according to claim 30, wherein the acidifying system and neutralizing system is present in a ratio of from 1:1 to 1:10.

32. Dry blend according to claim 30, wherein the neutralizing system comprises a pH raising agent selected from the group consisting of organic phosphates, oxides, hydroxides or combinations thereof and is encapsulated in water-resistant, heat-sensitive, fat based encapsulation.

33. Dry blend according to claim 32, wherein the pH raising agent is encapsulated with a water resistant, heat melting fat based coating.

34. Dry blend according to claim 33, wherein the fat based coating comprises vegetable oil.

35. A method for improving taste perception or organoleptic properties of a food composition which comprises incorporating in the food composition a combination of an acidifying preservative system that provides an antimicrobial effect that is effective for reducing microbial growth in the food composition, and a neutralizing system that is inactivated during storage of the food composition at microbiologically sensitive conditions, but is adapted to activate on demand to act on the acidifying preservative system to neutralize its sourness and/or acidity thereby improving the taste perception or organoleptic of the food composition, wherein the acidifying preservative system is free of strong acid and comprises an acidulent of at least one unsaturated organic carboxylic acid and a salt-based preservative agent comprising at least one salt of an organic acid that forms in combination with the acidulent a level of undissociated molecules to enhance the antimicrobial effect of the acidifying preservative system.

* * * * *